United States Patent
Park et al.

(10) Patent No.: US 9,094,281 B2
(45) Date of Patent: Jul. 28, 2015

(54) APPARATUS AND METHOD FOR IDENTIFYING TRANSMISSION CONTROL PROTOCOL (TCP) PACKET LOSS

(71) Applicant: ELECTRONICS AND TELECOMMUNICATIONS RESEARCH INSTITUTE, Daejeon (KR)

(72) Inventors: Man Kyu Park, Daejeon (KR); Deock Gil Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 13/752,498

(22) Filed: Jan. 29, 2013

(65) Prior Publication Data

US 2013/0194952 A1    Aug. 1, 2013

(30) Foreign Application Priority Data

Jan. 31, 2012 (KR) .......................... 10-2012-0009874

(51) Int. Cl.
*H04L 12/26* (2006.01)
*H04W 28/02* (2009.01)

(52) U.S. Cl.
CPC ............ *H04L 43/00* (2013.01); *H04L 43/0835* (2013.01); *H04W 28/0242* (2013.01)

(58) Field of Classification Search
None
See application file for complete search history.

(56) References Cited

U.S. PATENT DOCUMENTS

| | | | |
|---|---|---|---|
| 7,065,482 B2 * | 6/2006 | Shorey et al. ................. | 709/224 |
| 7,389,088 B2 * | 6/2008 | Kim ............................ | 455/41.1 |
| 7,684,329 B2 * | 3/2010 | Mohanty et al. .............. | 370/232 |
| 2006/0277298 A1 * | 12/2006 | Kim et al. ..................... | 709/224 |
| 2007/0280111 A1 * | 12/2007 | Lund ............................ | 370/235 |
| 2009/0086696 A1 * | 4/2009 | Naito et al. ................... | 370/338 |
| 2010/0238982 A1 * | 9/2010 | Shinozaki ..................... | 375/211 |
| 2011/0070836 A1 * | 3/2011 | Park et al. .................... | 455/41.2 |
| 2012/0275439 A1 * | 11/2012 | Bhushan et al. .............. | 370/336 |

OTHER PUBLICATIONS

Kai Xu, et al; "Improving TCP performance in integrated wireless communication netwroks", Computer Networks, vol. 47, pp. 219-237; Available online Aug. 6, 2004.

* cited by examiner

*Primary Examiner* — Hong Cho
(74) *Attorney, Agent, or Firm* — Ladas & Parry LLP (57) ABSTRACT

Provided is a method of identifying a transmission control protocol (TCP) packet loss, including transmitting at least one TCP data packet to a TCP receiver, estimating wireless channel status information using the TCP receiver by interaction between a TCP layer and a physical layer, and receiving an acknowledgement (ACK) packet including the estimated wireless channel status information from the TCP receiver.

18 Claims, 9 Drawing Sheets

APPARATUS AND METHOD FOR IDENTIFYING TRANSMISSION CONTROL PROTOCOL (TCP) PACKET LOSS

CROSS-REFERENCE TO RELATED APPLICATION

This application claims the priority benefit of Korean Patent Application No. 10-2012-0009874, filed on Jan. 31, 2012, in the Korean Intellectual Property Office, the disclosure of which is incorporated herein by reference.

BACKGROUND

1. Field of the Invention

Exemplary embodiments relate to an apparatus and method for identifying a transmission control protocol (TCP) packet loss to support a high-speed data communication service.

2. Description of the Related Art

For reliable end-to-end data transmission, transmission control protocol (TCP) is used in a transport layer of an open systems interconnection (OSI) 7 layer model.

In a network having a long transmission delay and a high transmission link loss rate, TCP may be deteriorated. Also, since TCP is designed for wired networks, TCP may fail to control a network congestion adaptively based on characteristics of networks in a wired and wireless mixed network environment.

For example, TCP may execute a congestion control when a packet loss occurs due to a link degradation of a wireless channel as well as when a packet loss occurs due to a network congestion, irrespective of a cause of the packet loss occurring. This unnecessary congestion control may lead to an unfavorable result, for example, a throughput reduced to half, cwnd=cwnd/2.

In this case, TCP may require a long period of time to recover a previously reached sending rate, which fails to maintain a high throughput in a wireless network having a high packet loss rate, resulting in a low network utilization.

To resolve this issue, a new TCP scheme, for example, TCP Westwood, TCP New Jersey, TCP Veno, and the like, have been proposed to improve the performance in a wireless network environment.

TCP Westwood may estimate an available bandwidth for each acknowledgement (ACK) packet received. On a packet loss, a slow start threshold (ssthresh) and a congestion window (cwin) may be set to be an estimated available bandwidth value.

When a packet loss is detected by three identicate ACKs, TCP Westwood may determine that the packet loss is caused by a link degradation of a wireless channel, and may calculate and set a number of packets to be transmitted, based on ssthresh and cwin as an estimated available bandwidth value.

When a timeout occurs, TCP Westwood may determine that the timeout is caused by network congestion, and may calculate and set a number of packets to be transmitted, based on cwnd=1 and ssthresh as an estimated available bandwidth value.

Accordingly, a need exists for a method of resolving an issue of reduced TCP throughput caused by unnecessary congestion control due to an incorrect determination as to packet loss and network congestion being present in a wired and wireless mixed network environment.

SUMMARY

According to an aspect of the present invention, there is provided an apparatus for identifying a transmission control protocol (TCP) packet loss, the apparatus including a receiving unit to receive at least one TCP data packet from a TCP sender, a measuring unit to measure a quality value of a current channel to update performance of TCP periodically, when the TCP data packet is received, a status estimating unit to estimate wireless channel status information by interaction between a TCP layer and a physical layer, and a transmitting unit to transmit an acknowledgement (ACK) packet including the estimated wireless channel status information to the TCP sender.

According to another aspect of the present invention, there is provided an apparatus for identifying a TCP packet loss, the apparatus including a transmitting unit to transmit at least one TCP data packet to a TCP receiver, and a receiving unit to receive an ACK packet including wireless channel status information from the TCP receiver, and the wireless channel status information may be estimated using the TCP receiver by interaction between a TCP layer and a physical layer.

The apparatus may further include a status information extracting unit to extract the wireless channel status information, a sequence number extracting unit to extract a sequence number of the at least one TCP data packet, a first determining unit to determine whether a packet loss is present by examining each of the sequence numbers, a second determining unit to determine whether a channel status is within a predetermined normal range when the packet loss is present in the at least one TCP data packet, and a recovering unit to recover a lost packet among the at least one TCP data packet when the channel status is out of the predetermined normal range.

The first determining unit may determine that the packet loss is present in the at least one TCP data packet when a duplicate sequence number is detected.

The second determining unit may determine whether the current channel status is within the predetermined normal range, by comparing the received channel status information value to a current channel status reference value.

The recovering unit may recover the lost packet and may execute a congestion control when the channel status is within the predetermined normal range.

The apparatus may further include a function performing unit to perform a function to increase a TCP send window when the packet loss is determined to be absent or when the lost packet is recovered.

The apparatus may further include an event executing unit to execute a timeout event for a TCP connection when reception of the ACK packet fails within a predetermined period, a determining unit to determine the channel status by comparing a last stored channel status value to a predetermined critical value, and a re-transmitting unit to re-transmit the entire lost packet when the last stored channel status value is greater than the predetermined critical value.

The determining unit may determine the current channel status to be a network congestion status when the last stored channel status value is greater than the predetermined critical value.

The apparatus may further include a congestion control executing unit to execute a congestion control when the entire lost packet is re-transmitted.

The re-transmitting unit may re-transmit the lost packet among the at least one TCP data packet when the last stored channel status value is less than the predetermined critical value.

The apparatus may further include a function performing unit to perform a function to increase a TCP send window when the lost packet among the at least one TCP data packet is re-transmitted.

According to still another aspect of the present invention, there is provided a method of identifying a TCP packet loss, the method including receiving at least one TCP data packet from a TCP sender, measuring a quality value of a current channel to update performance of TCP periodically when the TCP data packet is received, estimating wireless channel status information by interaction between a TCP layer and a physical layer, and transmitting an ACK packet including the estimated wireless channel status information to the TCP sender.

According to yet another aspect of the present invention, there is provided a method of identifying a TCP packet loss, the method including transmitting at least one TCP data packet to a TCP receiver, estimating wireless channel status information using the TCP receiver by interaction between a TCP layer and a physical layer, and receiving an ACK packet including the wireless channel status information from the TCP receiver.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
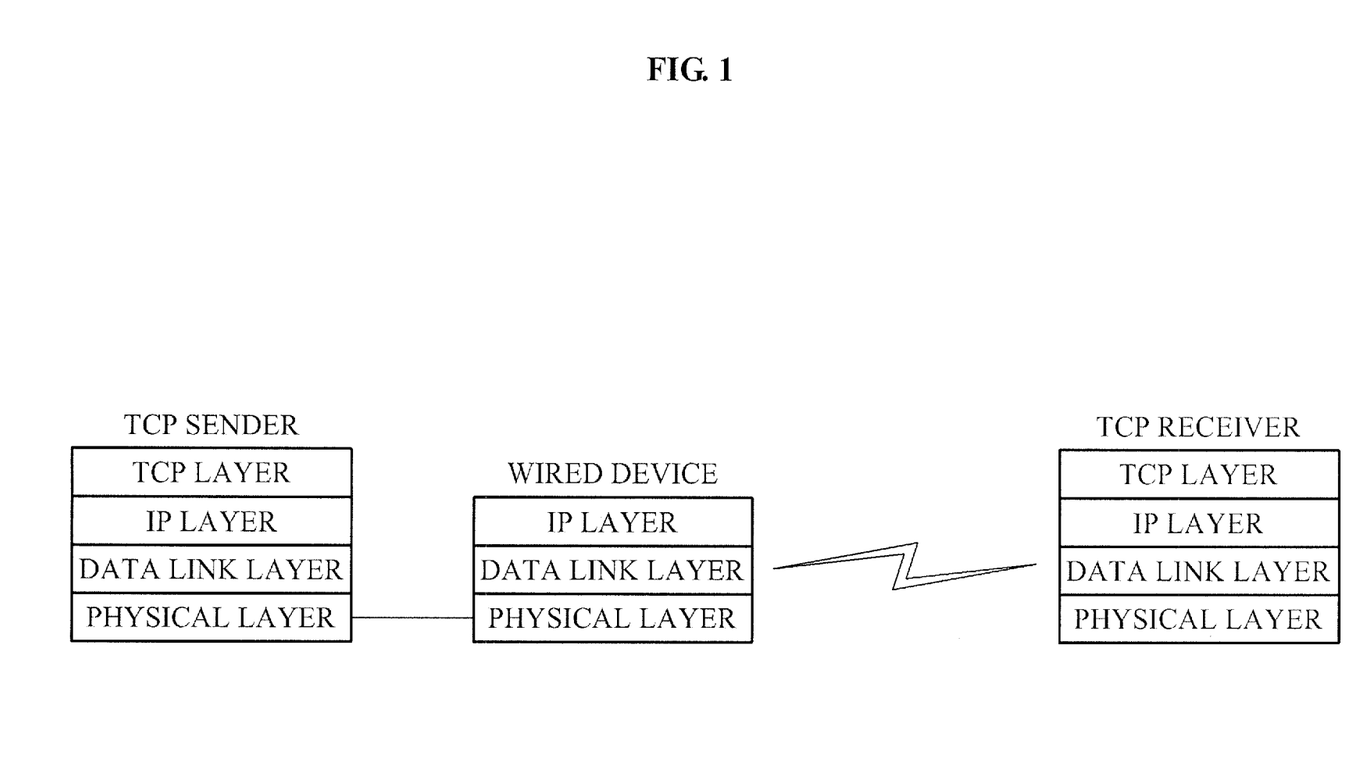
FIG. 1 is a diagram illustrating a system for identifying a transmission control protocol (TCP) packet loss according to an embodiment of the present invention.

FIG. 1 is a diagram illustrating a system for identifying a transmission control protocol (TCP) packet loss according to an embodiment of the present invention.

Referring to FIG. 1, the system for identifying a TCP packet loss according to an embodiment of the present invention may transmit a TCP data packet from a TCP sender to a TCP receiver that may measure a quality value of a current channel, for example, a signal-to-noise ratio (SNR) to update the performance of TCP periodically.

Also, the TCP receiver may transmit, to the TCP sender, a TCP acknowledgement (ACK) packet including wireless channel status information extracted by interaction between a TCP layer and a physical layer.

In an effort to improve understanding of exemplary embodiments of the present invention, the system for identifying a TCP packet loss is described based on the TCP receiver and the TCP sender, separately.

Figure 2:
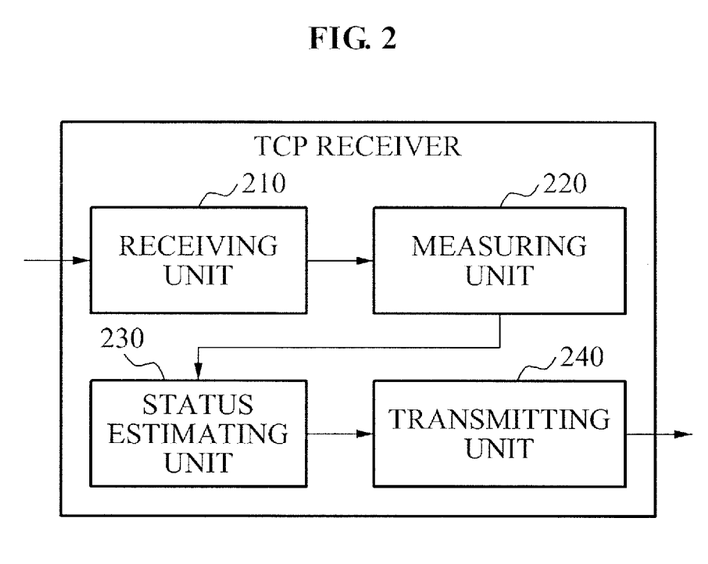
FIG. 2 is a diagram illustrating a TCP receiver according to an embodiment of the present invention.

FIG. 2 is a diagram illustrating the TCP receiver according to an embodiment of the present invention.

Referring to FIG. 2, the TCP receiver may include a receiving unit 210, a measuring unit 220, a status estimating unit 230, and a transmitting unit 240.

The receiving unit 210 may receive at least one TCP data packet from the TCP sender. When the TCP data packet is received, the measuring unit 220 may measure a quality value of a current channel to update the performance of TCP periodically. The status estimating unit 230 may estimate wireless channel status information by interaction between a TCP layer and a physical layer. The transmitting unit 240 may transmit an ACK packet including the wireless channel status information to the TCP sender.

Figure 3:
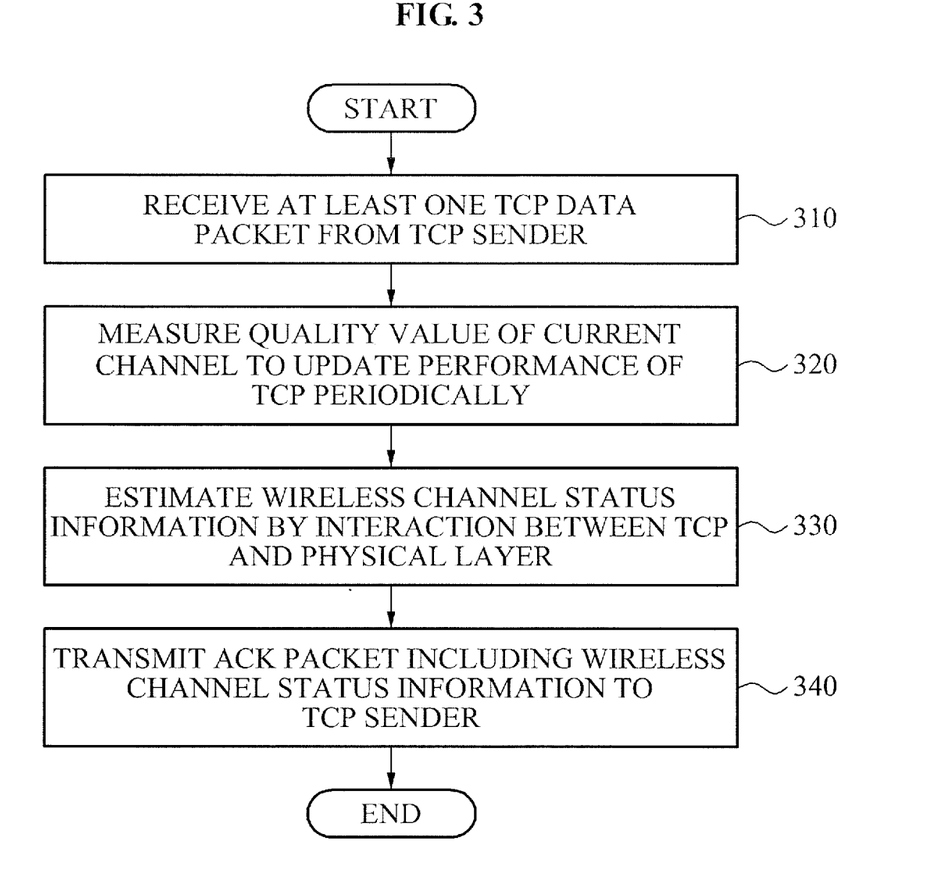
FIG. 3 is a flowchart illustrating a method for identifying a TCP packet loss from a TCP receiver according to an embodiment of the present invention.

FIG. 3 is a flowchart illustrating a method for identifying a TCP packet loss from the TCP receiver according to an embodiment of the present invention.

Referring to FIG. 3, in operation 310, the TCP receiver may receive at least one TCP data packet from the TCP sender.

In operation 320, when the TCP receiver receives the TCP data packet, the TCP receiver may measure a quality value of a current channel to update the performance of TCP periodically.

In operation 330, the TCP receiver may estimate wireless channel status information by interaction between a TCP layer and a physical layer.

In operation 340, the TCP receiver may transmit an ACK packet including the wireless channel status information to the TCP sender.

Figure 4:
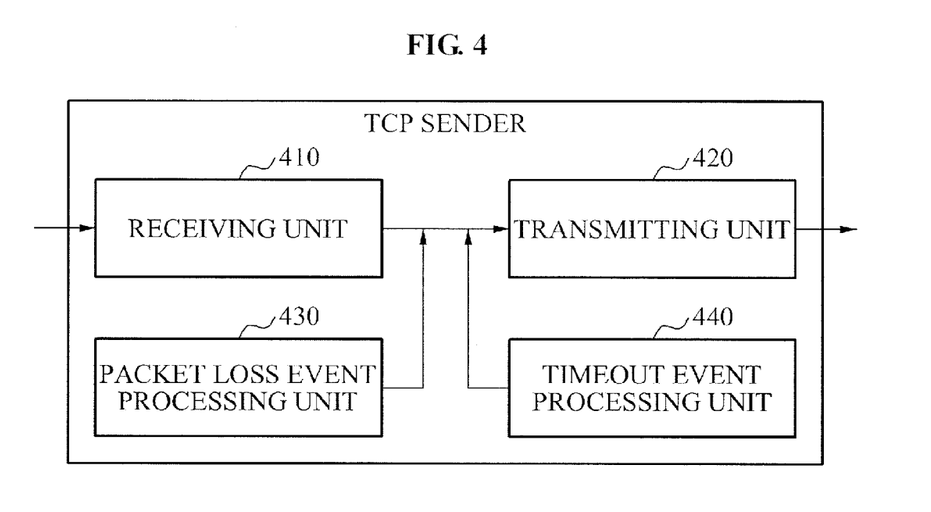
FIG. 4 is a diagram illustrating a TCP sender according to an embodiment of the present invention.

FIG. 4 is a diagram illustrating the TCP sender according to an embodiment of the present invention.

Referring to FIG. 4, the TCP sender may include a receiving unit 410, a transmitting unit 420, a packet loss event processing unit 430, and a timeout event processing unit 440.

The transmitting unit 420 may transmit at least one TCP data packet to the TCP receiver. The receiving unit 410 may receive an ACK packet including wireless channel status information from the TCP receiver. The wireless channel status information may be estimated using the TCP receiver by interaction between a TCP layer and a physical layer. When an occurrence of packet loss is determined, the packet loss event processing unit 430 may process a packet loss event. When an occurrence of network congestion is determined, the timeout event processing unit 440 may conduct a congestion recovery.

Figure 5:
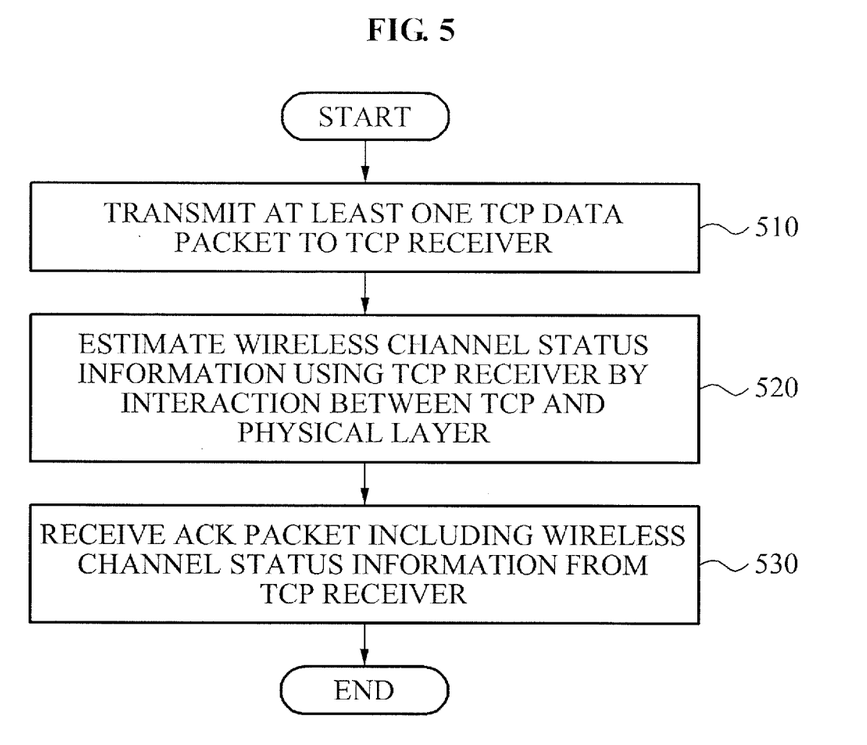
FIG. 5 is a flowchart illustrating a method for identifying a TCP packet loss from a TCP sender according to an embodiment of the present invention.

FIG. 5 is a flowchart illustrating a method for identifying a TCP packet loss from the TCP sender according to an embodiment of the present invention.

Referring to FIG. 5, in operation 510, the TCP sender may transmit at least one TCP data packet to the TCP receiver.

In operation 520, the TCP sender may request the TCP receiver to estimate wireless channel status information by interaction between a TCP layer and a physical layer.

In operation 530, the TCP sender may receive an ACK packet including the wireless channel status information from the TCP receiver.

When the TCP sender receives the ACK packet including the wireless channel status information estimated from the physical layer, the TCP sender may determine whether packet loss or network congestion occurs, based on the received wireless channel status information.

Figure 6:
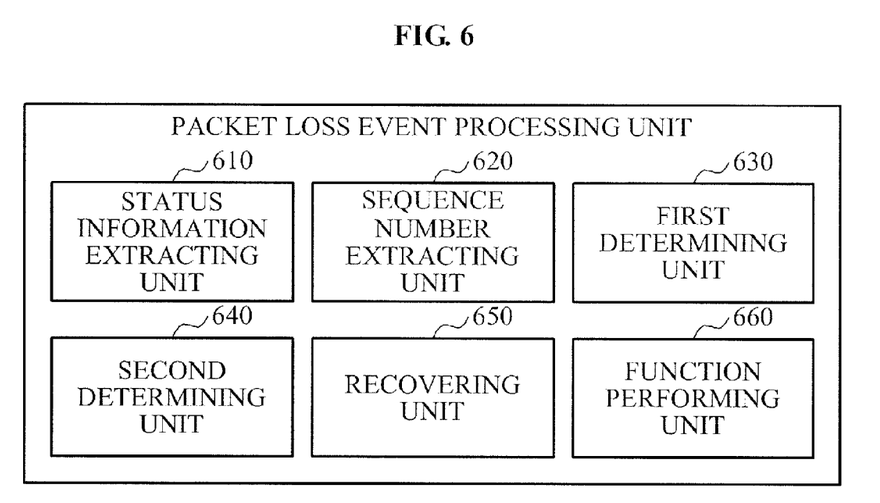
FIG. 6 is a diagram illustrating a packet loss event processing unit according to an embodiment of the present invention.

FIG. 6 is a diagram illustrating the packet loss event processing unit according to an embodiment of the present invention.

Referring to FIG. 6, the packet loss event processing unit may include a status information extracting unit 610, a sequence number extracting unit 620, a first determining unit 630, a second determining unit 640, a recovering unit 650, and a function performing unit 660.

The status information extracting unit 610 may extract wireless channel status information. The sequence number extracting unit 620 may extract a sequence number of at least one TCP data packet. The first determining unit 630 may determine whether packet loss is present by examining each of the sequence numbers. When packet loss is determined to be present in the at least one TCP data packet, the second determining unit 640 may determine whether a current channel status is within a predetermined normal range. When the channel status is out of the predetermined normal range, the recovering unit 650 may recover a packet that is lost among the at least one TCP data packet. The function performing unit 660 may perform a function to increase a TCP send window.

Figure 7:
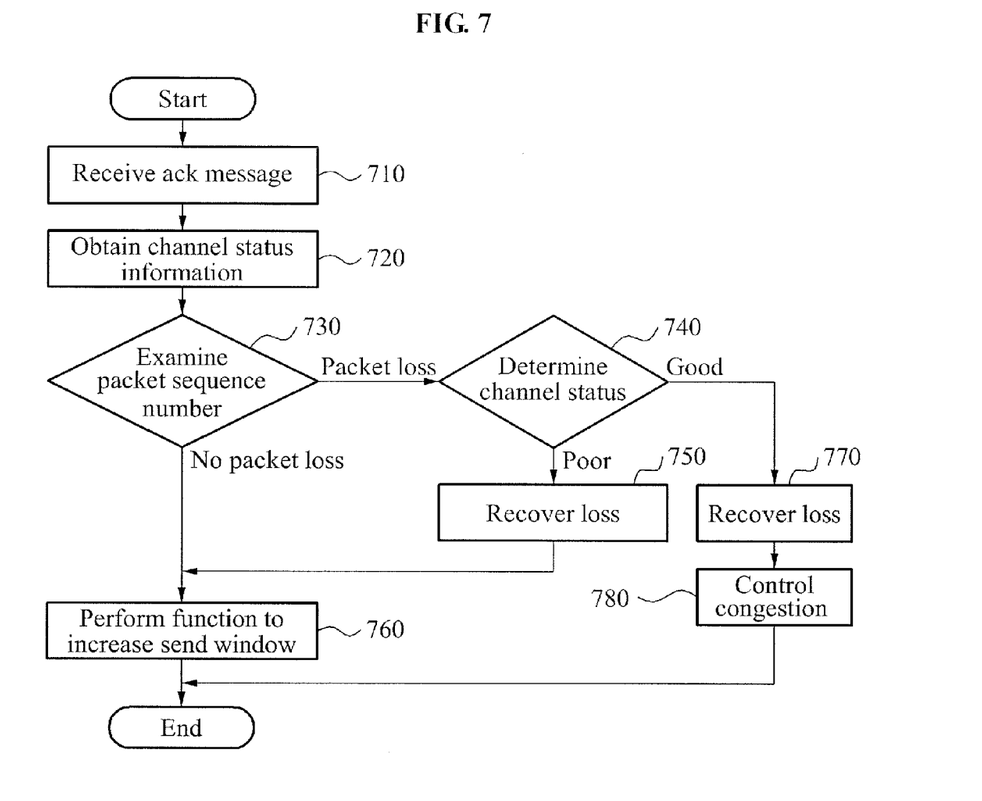
FIG. 7 is a flowchart illustrating a method of processing a packet loss event according to an embodiment of the present invention.

FIG. 7 is a flowchart illustrating a method of processing a packet loss event according to an embodiment of the present invention.

Referring to FIG. 7, the packet loss event processing unit may receive an ACK packet from the TCP receiver in operation 710, may obtain channel status information in operation 720, and may examine a TCP packet sequence number in operation 730.

When a duplicate sequence number is detected, the first determining unit 630 may determine that a packet loss is present in the at least one TCP data packet.

In operation 740, the second determining unit 640 may determine whether a current channel status is within a predetermined normal range, by comparing the received channel status information value to a current channel status reference value.

That is, when packet loss is determined to be present, the packet loss event processing unit may determine whether a quality status of a current channel is suitable for transmission, for example, quality degradation, through comparison of channel conditions.

When the channel status is within the predetermined normal range, the recovering unit 650 may recover the lost packet in operation 770, and may execute a congestion control in operation 780.

That is, when the current channel status is determined to be suitable, the packet loss event processing unit may determine that the packet loss occurs due to a network congestion, may recover the lost packet, and may execute a congestion control.

Conversely, when packet loss is determined to be absent or when the lost packet is recovered, the packet loss event processing unit may perform a function of increasing a TCP send window normally in operation 760.

When the channel status is determined to be unsuitable, the packet loss event processing unit may determine that packet loss is caused by a temporary quality degradation of a wireless channel and may recover the lost packet in operation 750, and may perform a function of increasing a TCP send window normally in operation 760.

Figure 8:
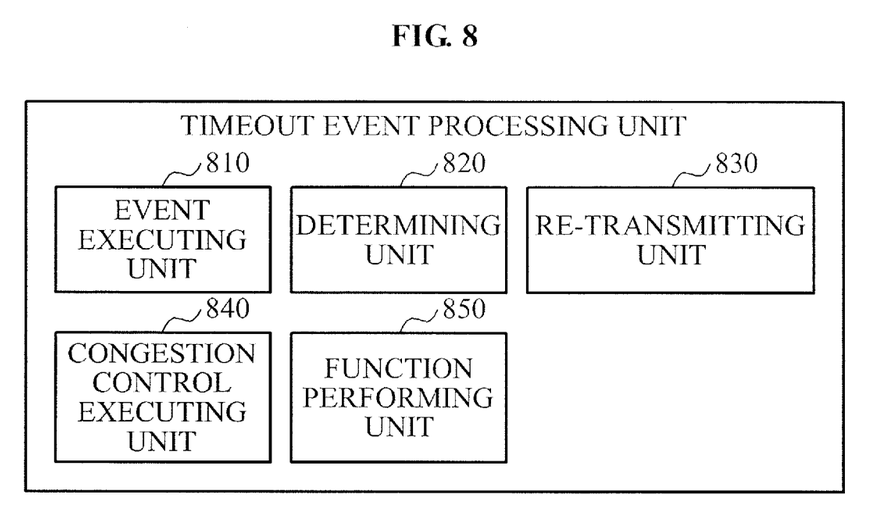
FIG. 8 is a diagram illustrating a timeout event processing unit according to an embodiment of the present invention.

FIG. 8 is a diagram illustrating the timeout event processing unit according to an embodiment of the present invention.

Referring to FIG. 8, the timeout event processing unit may include an event executing unit 810, a determining unit 820, a re-transmitting unit 830, a congestion control executing unit 840, and a function performing unit 850.

The event executing unit 810 may execute a timeout event for a TCP connection when an ACK packet fails to be received within a predetermined period. The determining unit 820 may determine a channel status by comparing a last stored channel status value to a predetermined critical value. The re-transmitting unit 830 may re-transmit the entire lost packet when the last stored channel status value is greater than the predetermined critical value. The congestion control executing unit 840 may execute a congestion control. The function performing unit 850 may perform a function to increase a TCP send window.

Figure 9:
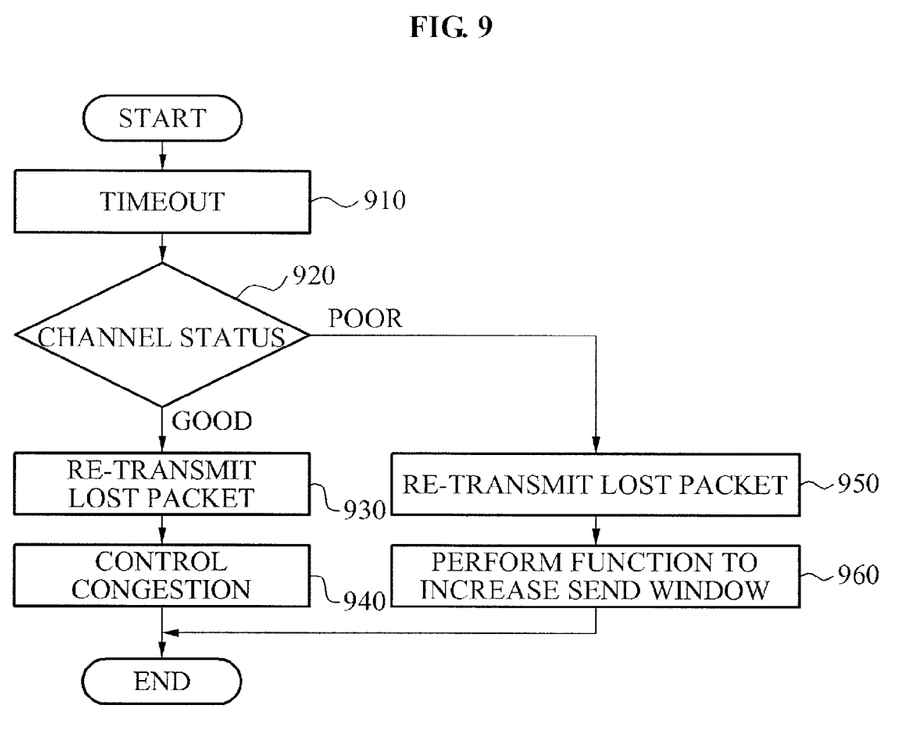
FIG. 9 is a diagram illustrating a method of processing a timeout event according to an embodiment of the present invention.

FIG. 9 is a diagram illustrating a method of processing a timeout event according to an embodiment of the present invention.

Referring to FIG. 9, in operation 910, the timeout event processing unit may execute a timeout event when an ACK packet to a transmitted TCP packet fails to be received within a predetermined period.

In operation 920, the determining unit 820 may determine a current channel status to be a network congestion status when a last stored channel status value is greater than a predetermined critical value.

In operation 930, the timeout event processing unit may re-transmit the entire lost packet, and in operation 940, may execute a congestion control.

That is, when the last stored channel status value is greater than the predetermined critical value, that is, when the channel status is determined to be suitable, the timeout event processing unit may determine the current channel status to be a network congestion status, may re-transmit the entire lost packet, and may execute a congestion control.

Conversely, when the last stored channel status value is less than the predetermined critical value, the re-transmitting unit 830 may re-transmit a lost packet among at least one TCP data packet in operation 950, and may perform a function to increase a TCP send window normally in operation 960.

That is, when the channel status is determined to be poor, the timeout event processing unit may determine that the timeout is caused by channel degradation, and may re-transmit only a lost packet. After the lost packet is re-transmitted, the timeout event processing unit may perform a function to increase a TCP send window normally absent congestion control.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the exemplary embodiments of the present invention, a throughput may be improved by identifying a TCP packet loss in a wired and wireless mixed network environment Also, unnecessary congestion control may be prevented and the performance of TCP may be improved by identifying a TCP packet loss based on wireless channel status information estimated from a physical layer, carried by a TCP ACK, from a TCP receiver to a TCP sender.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for identifying a transmission control protocol (TCP) packet loss, the apparatus comprising:
   a receiving unit to receive at least one TCP data packet from a TCP sender;
   a measuring unit to measure a quality value of a current channel to update performance of TCP periodically, when the TCP data packet is received;
   a status estimating unit to estimate wireless channel status information by interaction between a TCP layer and a physical layer;
   a transmitting unit to transmit an acknowledgement (ACK) packet including the estimated wireless channel status information to the TCP sender;
   an event executing unit to execute a timeout event for a TCP connection when reception of the ACK packet fails within a predetermined period;
   a determining unit to determine the channel status by comparing a last stored channel status value to a predetermined critical value; and
   a re-transmitting unit to re-transmit the entire lost packet t when the last stored channel status value is greater than the predetermined critical value.

2. An apparatus for identifying a transmission control protocol (TCP) packet loss, the apparatus comprising:
   a transmitting unit to transmit at least one TCP data packet to a TCP receiver;
   a receiving unit to receive an ACK packet including wireless channel status information from the TCP receiver, wherein the wireless channel status information is estimated using the TCP receiver by interaction between a TCP layer and a physical layer;
   an event executing unit to execute a timeout event for a TCP connection when reception of the ACK packet fails within a predetermined period;
   a determining unit to determine the channel status by comparing a last stored channel status value to a predetermined critical value; and
   a re-transmitting unit to re-transmit the entire lost packet when the last stored channel status value is greater than the predetermined critical value.

3. The apparatus of claim 2, further comprising:
   a status information extracting unit to extract the wireless channel status information;
   a sequence number extracting unit to extract a sequence number of the at least one TCP data packet;
   a first determining unit to determine whether a packet loss is present by examining each of the sequence numbers;
   a second determining unit to determine whether a channel status is within a predetermined normal range when the packet loss is present in the at least one TCP data packet; and
   a recovering unit to recover a lost packet among the at least one TCP data packet when the channel status is out of the predetermined normal range.

4. The apparatus of claim 3, wherein the first determining unit determines that the packet loss is present in the at least one TCP data packet when a duplicate sequence number is detected.

5. The apparatus of claim 3, wherein the second determining unit determines whether the current channel status is within the predetermined normal range, by comparing the received channel status information value to a current channel status reference value.

6. The apparatus of claim 3, wherein the recovering unit recovers the lost packet and executes a congestion control when the channel status is within the predetermined normal range.

7. The apparatus of claim 3, further comprising:
   a function performing unit to perform a function to increase a TCP send window when the packet loss is determined to be absent or when the lost packet is recovered.

8. The apparatus of claim 2, wherein the determining unit determines the current channel status to be a network congestion status when the last stored channel status value is greater than the predetermined critical value.

9. The apparatus of claim 2, further comprising:
   a congestion control executing unit to execute a congestion control when the entire lost packet is re-transmitted.

10. The apparatus of claim 2, wherein the re-transmitting unit re-transmits the lost packet among the at least one TCP data packet when the last stored channel status value is less than the predetermined critical value.

11. The apparatus of claim 10, further comprising:
    a function performing unit to perform a function to increase a TCP send window when the lost packet among the at least one TCP data packet is re-transmitted.

12. A method of identifying a transmission control protocol (TCP) packet loss, the method comprising:
    receiving at least one TCP data packet from a TCP sender;
    measuring a quality value of a current channel to update performance of TCP periodically, when the TCP data packet is received;
    estimating wireless channel status information by interaction between a TCP layer and a physical layer; and
    transmitting an acknowledgement (ACK) packet including the estimated wireless channel status information to the TCP sender;
    executing a timeout event for a TCP connection when reception of the ACK packet fails within a predetermined period;
    determining the channel status by comparing a last stored channel status value to a predetermined critical value; and
    re-transmitting the entire lost packet when the last stored channel status value is greater than the predetermined critical value.

13. A method of identifying a transmission control protocol (TCP) packet loss, the method comprising:
    transmitting at least one TCP data packet to a TCP receiver;
    estimating wireless channel status information using the TCP receiver by interaction between a TCP layer and a physical layer;

receiving an ACK packet including the wireless channel status information from the TCP receiver;

executing a timeout event for a TCP connection when reception of the ACK packet fails within a predetermined period;

determining the channel status by comparing a last stored channel status value to a predetermined critical value; and re-transmitting the entire lost packet when the last stored channel status value is greater than the predetermined critical value.

14. The method of claim 13, further comprising:

extracting the wireless channel status information;

extracting a sequence number of the at least one TCP data packet;

determining whether a packet loss is present by examining each of the sequence numbers;

determining whether a channel status is within a predetermined normal range when the packet loss is present in the at least one TCP data packet; and recovering a lost packet among the at least one TCP data packet when the channel status is out of the predetermined normal range.

15. The method of claim 14, further comprising:

recovering the lost packet and executing a congestion control when the channel status is within the predetermined normal range.

16. The method of claim 14, further comprising:

performing a function to increase a TCP send window when the packet loss is determined to be absent or when the lost packet is recovered.

17. The method of claim 13, further comprising:

executing a congestion control using when the entire lost packet is re-transmitted.

18. The method of claim 13, further comprising:

re-transmitting the lost packet among the at least one TCP data packet when the last stored channel status value is less than the predetermined critical value; and performing a function to increase a TCP send window.

* * * * *